//
Patented Jan. 20, 1942

2,270,678

UNITED STATES PATENT OFFICE 2,270,678

MONOAZO DYESTUFFS INSOLUBLE IN WATER

Ernst Fischer, Offenbach-on-the-Main, Germany, assignor to General Aniline & Film Corporation, a corporation of Delaware No Drawing. Application September 15, 1939, Serial No. 295,051. In Germany September 15, 1938

5 Claims. (Cl. 260—204)

The present invention relates to mono-azo-dyestuffs insoluble in water; more particularly, it relates to dyestuffs of the following general formula:

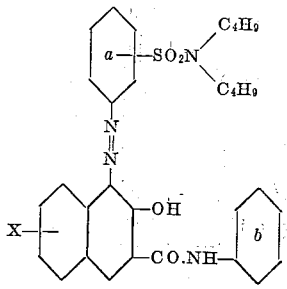

wherein X stands for hydrogen, halogen or alkoxy, the benzene radical $a$ contains at least one alkoxy, aralkoxy or aryloxy group and may contain further substituents and the benzene radical $b$ contains at most two substituents.

I have found that valuable pigment dyestuffs soluble in organic solvents may be obtained by coupling a diazo-compound from an amine of the general constitution:

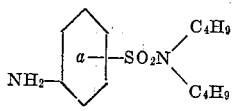

wherein the benzene radical $a$ contains at least one alkoxy, aralkoxy or aryloxy group and may contain further substituents, with a 2.3-hydroxy-naphthoylaminobenzene which may contain as a substituent in the hydroxynaphthoyl radical a halogen atom or an alkoxy group and contains in the benzene radical at most two further substituents, as for instance, alkyl, alkoxy, aralkoxy, aryloxy, nitro-groups or halogen atoms, only such dyestuff components being used as do not contain any group lending solubility in water, for instance, a sulphonic acid or carboxylic acid group.

The new dyestuffs are insoluble in water, but very easily soluble in many organic solvents, as for instance, hydrocarbons, alcohols, esters, ketones and, therefore, can be used for colouring these solvents as well as the lacquers prepared by means of these solvents, such as nitro- or acetyl-cellulose lacquers, films or plastic masses. They are also very suitable for colouring varnishes, candles and fats. Owing to the different substituents present in the dyestuffs the suitability of the organic solvents named varies, but the most suitable solvents may easily be ascertained by experiment.

In comparison with the dyestuffs described in German patents, Nos. 480,814, 575,216, 582,277 and 587,652, the dyestuffs obtainable by the present invention are distinguished by their enhanced solubility in organic solvents so that they are very suitable for colouring substances of the aforesaid kind, whereas the dyestuffs of the said patents have either no solubility in organic solvents or a solubility too small for these purposes.

The following examples serve to illustrate the invention, but they are not intended to limit it thereto, the parts being by weight:

(1) 31.4 parts of 1-amino-2-methoxybenzene-5-(sulphonyl-n-dibutylamine) are diazotised in the usual manner. Thereupon sodium acetate is added to the diazo-solution in order to bind the mineral acid in excess and the diazo-solution is then stirred into a solution of 29.3 parts of 2.3-hydroxynaphthoyl-(1'-amino-4'-methoxybenzene) in dilute caustic soda solution. When the coupling is complete, the dyestuff obtained is filtered with suction, washed well and dried. It is a red powder which dissolves easily in butyl acetate, acetone, xylene and other organic solvents and colours cellulose ester lacquers red tints of good fastness to light. The dyestuff corresponds with the following formula:

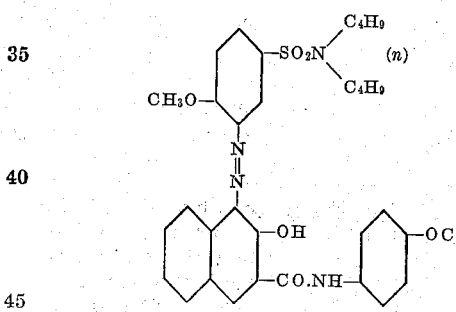

(2) 32.8 parts of 1-amino-4-ethoxybenzene-5-(sulphonyl-n-dibutyl amine) are diazotised in the usual manner. The diazo-solution which has been made nuetral to Congo paper by means of sodium acetate is stirred into a solution of 26.3 parts of 2.3-hydroxynaphthoyl-aminobenzene in dilute caustic soda solution. The dyestuff obtained is filtered with suction, washed well and dried. It dissolves easily in butyl alcohol, ethyl acetate and other organic solvents and colours nitrocellulose and acetyl cellulose lacquers as well as varnishes red tints of good properties of fastness.

(3) If there are used, in Example 1, instead of 31.4 parts of 1-amino-2-methoxybenzene-5-(sulphonyl-n-dibutylamine) 34.4 parts of 1-amino-2.5-dimethoxybenzene-4-(sulphonyl - n - dibutylamine), a dyestuff of similarly good properties of fastness is obtained; it colours the various organic solvents and the lacquers prepared therewith as well as candles and fats Bordeaux-red tints.

The following table indicates a number of other mono-azo-dyestuffs obtainable by this invention, which are likewise easily soluble in the solvents suitable for these purposes and have good properties of fastness.

sulphonic acid and the carboxylic acid group.

I claim:

1. The water-insoluble mono-azo-dyestuffs of the following general formula

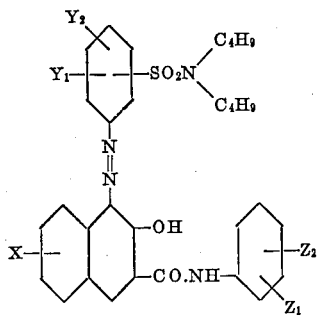

wherein X stands for a member of the group consisting of hydrogen, alkoxy and halogen, $Y_1$ stands for a member of the group consisting of

| | Diazo-compound from— | Coupled with— | Shade |
|---|---|---|---|
| | | 2.3-hydroxynaphthoyl— | |
| 1 | 1-amino-2-methoxybenzene-5-(sulphonyl-n-dibutylamine). | Aminobenzene | Red. |
| 2 | ....do.... | (1'-amino-3'-methyl-4'-methoxybenzene) | Red. |
| 3 | ....do.... | (1'-amino-2'-methoxybenzene) | Red. |
| 4 | ....do.... | (1'-amino-2'.4'-dimethylbenzene) | Red. |
| 5 | 1-amino-4-methoxybenzene-5-(sulphonyl-n-dibutylamine). | (1'-amino-4'-methoxybenzene) | Red. |
| 6 | ....do.... | (1'-amino-2'-ethoxybenzene) | Red. |
| 7 | ....do.... | (1'-amino-3'-nitrobenzene) | Red. |
| 8 | ....do.... | (1'-amino-4'-chlorobenzene) | Red. |
| 9 | ....do.... | (1'-amino-4'-methylbenzene) | Red. |
| 10 | ....do.... | (1'-amino-2'-methoxy-5'-chlorobenzene) | Red. |
| 11 | ....do.... | (1'-amino-2'-ethylbenzene) | Red. |
| 12 | ....do.... | (1'-amino-2'-bromobenzene) | Red. |
| 13 | ....do.... | (1'-amino-2'-benzyloxybenzene) | Red. |
| 14 | ....do.... | (1'-amino-2'-phenoxybenzene) | Red. |
| 15 | ....do.... | (1'-amino-4'-phenoxybenzene) | Red. |
| 16 | ....do.... | (4'-amino-diphenyl) | Red. |
| 17 | ....do.... | (4'-amino-1'', 2'', 3'', 4'', 5'', 6''-hexahydrodiphenyl) | Red. |
| 18 | ....do.... | (4'-amino-1'', 2'', 3'', 4''-tetrahydrodiphenyl) | Red. |
| 19 | 1-amino-2-ethoxybenzene-5-(sulphonyl-n-dibutylamine). | (1'-amino-2'-methoxy-5'-chlorobenzene) | Red. |
| 20 | ....do.... | (1'-amino-4'-methoxybenzene) | Red. |
| 21 | 1-amino-2-benzyloxybenzene-5-(sulphonyl-n-dibutylamine). | ....do.... | Red. |
| 22 | 1-amino-4-ethoxybenzene-5-(sulphonyl-n-dibutylamine). | ....do.... | Red. |
| 23 | 1-amino-2-phenoxybenzene-5-(sulphonyl-n-dibutylamine). | ....do.... | Red. |
| 24 | 1-amino-3-methoxybenzene-5-(sulphonyl-n-dibutylamine). | ....do.... | Red. |
| 25 | 1-amino-4-methoxybenzene-6-(sulphonyl-n-dibutylamine). | ....do.... | Red. |
| 26 | 1-amino-2-methoxybenzene-5-(sulphonyl-di-isobutylamine). | ....do.... | Red. |
| 27 | 1-amino-2.4-dimethoxybenzene-5-(sulphonyl-n-dibutylamine). | ....do.... | Red. |
| 28 | 1-amino-2-methoxy-4-chlorobenzene-5-(sulphonyl-n-dibutylamine). | ....do.... | Red. |
| 29 | 1-amino-2-methoxy-5-methylbenzene-4-(sulphonyl-n-dibutylamine). | ....do.... | Red. |
| 30 | 1-amino-2-methoxybenzene-4-(sulphonyl-n-dibutylamine). | (1'-amino-4'-methoxybenzene) | Red. |
| 31 | 1-amino-2.5-dimethoxybenzene-4-(sulphonyl-n-dibutylamine). | Aminobenzene | Bordeaux. |
| 32 | ....do.... | (1'-amino-2'.5'-dimethoxybenzene) | Bordeaux. |
| 33 | 1-amino-2.5-diethoxybenzene-4-(sulphonyl-n-dibutylamine). | (1'-amino-4'-methoxybenzene) | Bordeaux. |
| | | 6-bromo-2.3-hydroxynaphthoyl— | |
| 34 | 1-amino-2.5-dimethoxybenzene-4-(sulphonyl-n-dibutylamine). | (1'-amino-2'-methyl-4'-chlorobenzene) | Red-violet. |
| 35 | ....do.... | (1'-amino-3'-nitrobenzene) | Red-violet. |
| | | 6-methoxy-2.3-hydroxynaphthoyl— | |
| 36 | ....do.... | Aminobenzene | Red-violet. |
| 37 | 1-amino-2-methoxybenzene-5-(sulphonyl-n-dibutylamine). | ....do.... | Bordeaux. |
| 38 | 1-amino-2.5-dimethoxybenzene-4-(sulphonyl-n-dibutylamine). | (1'-amino-3'-nitrobenzene) | Violet. |

Since an object of the present invention is to provide dyestuffs of good fastness properties which dyestuffs are insoluble in water and alkalies, it is to be understood that the aromatic nuclei of the general formulae appearing in the appended claims, do not contain any substituents which are known to render organic compounds soluble in water or alkalies and to tend to depreciate the fastness of the dyestuffs to alkalies. Substituents of this kind are, for instance, the alkoxy, benzyloxy and phenoxy, $Y_2$ for a member of the group consisting of hydrogen, alkoxy, alkyl and halogen, $Z_1$ for a member of the group consisting of hydrogen, alkyl, alkoxy, benzyloxy, phenoxy, phenyl, hydrogenated phenyl, nitro and halogen and $Z_2$ for a member of the group consisting of hydrogen, alkyl and alkoxy, being insoluble in water, but very easily soluble in organic solvents and yielding red to violet shades of good properties of fastness.

2. The water-insoluble mono-azo-dyestuffs of the following general formula:

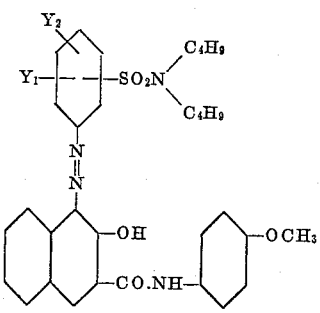

wherein $Y_1$ stands for a member of the group consisting of alkoxy, benzyloxy and phenoxy, $Y_2$ for a member of the group consisting of hydrogen, alkoxy, alkyl and halogen, being insoluble in water, but very easily soluble in organic solvents and yielding red shades of good properties of fastness.

3. The water-insoluble mono-azo-dyestuff of the following formula:

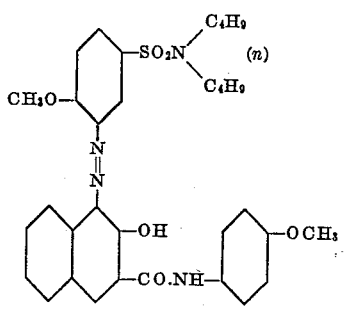

being a red powder which dissolves easily in organic solvents, such as butyl alcohol, butyl acetate, acetone, xylene and colours, for instance, cellulose ester lacquers red tints of good fastness to light.

4. The water-insoluble mono-azo-dyestuff of the following formula:

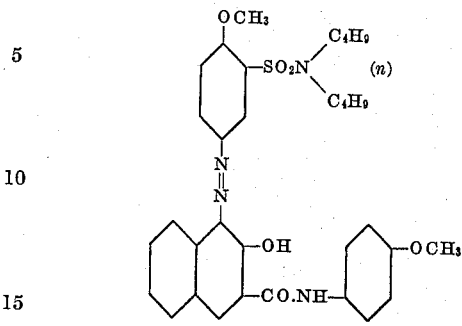

being a red powder which dissolves easily in organic solvents, such as butyl alcohol, butyl acetate, acetone, xylene and colours, for instance, cellulose ester lacquers red tints of good properties of fastness.

5. The water-insoluble mono-azo-dyestuff of the following formula:

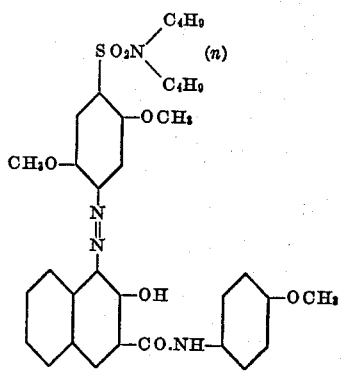

being a red powder which dissolves easily in organic solvents, such as butyl alcohol, butyl acetate, acetone, xylene and colours, for instance cellulose ester lacquers as well as candles and fats Bordeaux-red tints of good properties of fastness.

ERNST FISCHER.